United States Patent [19]

McEvily

[11] Patent Number: 4,981,708
[45] Date of Patent: Jan. 1, 1991

[54] METHOD OF PREVENTING BROWNING IN FOODS UTILIZING PROTEASE FREE LATEX EXTRACTS PARTICULARLY FROM FIGS

[75] Inventor: Arthur J. McEvily, Weston, Mass.

[73] Assignee: Enzytech, Inc., Cambridge, Mass.

[21] Appl. No.: 416,014

[22] Filed: Oct. 2, 1989

[51] Int. Cl.$^5$ .............................................. A23B 7/00
[52] U.S. Cl. ................................... 426/262; 426/270; 426/330; 426/331; 426/542; 426/655
[58] Field of Search .................. 426/262, 270, 49, 63, 426/333, 330 S, 541, 542, 330, 331, 655, 641, 643, 652

[56] References Cited

U.S. PATENT DOCUMENTS

| | | | |
|---|---|---|---|
| 3,859,450 | 1/1975 | Alsina | 426/643 |
| 3,982,030 | 9/1976 | Alsina | 426/643 |
| 4,024,285 | 5/1977 | Beuk | 426/63 |
| 4,284,653 | 8/1981 | Shigeoka | 426/643 |

FOREIGN PATENT DOCUMENTS

| | | | |
|---|---|---|---|
| 42041 | 11/1973 | Australia | 426/643 |
| 55-120796 | 7/1982 | Japan . | |
| 58-171343 | 9/1983 | Japan . | |

OTHER PUBLICATIONS

Kim, Research Reports of the Office of Rural Development Livestock and Veterinary, 1982, pp. 24 and 35–38, FSTA 85–01–50005.
The American Heritage Dictionary, 1982, Houghton Mifflen Co., p. 716.
McCord, 1983, J. Food Science, 48:1479–1483.
Salunkhe, 1984, Postharvest Biotechnology of Fruits, vol. II, CRC Press, Inc., Boca Raton, Fla., pp. 47–53.
Chemical Abstracts, 106:209854h.
J.D. McCord and A. Kilara, *J. of Food Science*, 48:1479–1483, (1983).
J. Zawistowski et al., *Can. Inst. Food Sci. Tech.*, 20:162–165, (1987).
J. R. L. Walker, *Food Technology*, 11:341–345, (1976).
M. B. Faulkner et al., *Advanced Food Research*, 19:302–310, (1953).
T. P. Labuza, *Cereal Foods World*, 34(4):353, (1989).
D. D. Duxbury (Ed.), *Food Processing*, Apr. 1990, p. 44.
T. Labuza, *Seafood Leader*, May/Jun. (1990).

*Primary Examiner*—Carolyn Paden
*Attorney, Agent, or Firm*—Hamilton, Brook, Smith & Reynolds

[57] ABSTRACT

A protease-free composition and method for producing it is disclosed. The protease-free composition inhibits the enzymatic and non-enzymatic browning of foods and beverages susceptible to browning, such as shrimp, mushrooms and wines. A method for inhibiting browning using the protease-free extract is described.

33 Claims, 5 Drawing Sheets

METHOD OF PREVENTING BROWNING IN FOODS UTILIZING PROTEASE FREE LATEX EXTRACTS PARTICULARLY FROM FIGS

DESCRIPTION

BACKGROUND

Browning of foods is a major problem in the food and beverage industry. Browning, or oxidative darkening, can be the result of the action of an enzyme, such as polyphenol oxidase (PPO), or a result of a non-enzymatic chemical reaction, for example, due to polymerization of phenolic compounds which are present in some foods. High PPO activity is present in foods which are susceptible to browning e.g., shrimp bananas and mushrooms. Browning causes deleterious changes in the appearance and texture of foods and beverages. Both enzymatic and non-enzymatic browning constitute serious problems for the food industry and result in millions of pounds of wasted food products per year.

Enzymatic browning, in particular, has been the subject of much research, particularly as the causative agent of shrimp melanosis, which is characterized by the formation of dark spots on shrimp. Faulkner et al., *Advanced Food Research*, 19:302-310 (1953). Enzymatic browning is the result of PPO-catalyzed oxidation of mono, and diphenols to o-quinones which polymerize spontaneously to form dark-colored, high molecular weight polymers, leading to the characteristic browning or formation of dark spots.

Several methods have been developed to prevent browning, including heat inactivation of PPO and various chemical treatments, such as altering the pH of the food. Heat inactivation is not appropriate for fresh foods, however such as fruits and seafood as the high temperatures necessary to inactivate PPO change the quality and texture of the foods. Likewise, reducing the pH by adding an acid (e.g., citric acid or phosphoric acid) deleteriously affects the appearance and quality of some foods.

The control of PPO-catalyzed enzymatic browning in mushrooms using citric acid was reported by McCord and Kilara in the *Journal of Food Science*, 48:1479-1483 (1983). The inhibition of polyphenol oxidase activity in an extract of Jerusalem artichokes using various sulfite compounds was described in Zawistowski et al., in *Can. Inst. Food Sci. Tech. J.*, 20(3):162-165 (1987). The use of cinnamic acid, p-coumaric acid and ferulic acid to control enzymatic browning in fruit juices was described by J. R. L. Walker in *Food Technology*, 11:341-345 (1976). None of these methods have proven entirely satisfactory, however, due to expense, lack of availability, or inferior performance.

Labuza in *Cereal Foods World*, 34(4):353 (1989) describes the use of proteases especially ficin, in the control of enzymatic browning of certain foods. The author attributed this effect to attack on PPO by the protease.

Another method for reducing browning which has been prevalent in the food industry is adding sulfite salts to foods and beverages. Some forms of enzymatic browning, such as shrimp melanosis, have traditionally been treated by dipping or coating the shrimp or other food in a sulfite solution, such as sodium bisulfite. Sulfites are also added to wines to prevent oxidation. Sulfites reduce o-quinones to the mono- and/or diphenols, thereby inhibiting the browning reaction. However the use of sulfite in foods has been restricted due to adverse health effects in certain individuals, and may be eliminated completely.

SUMMARY OF THE INVENTION

The invention relates to a composition and method for inhibiting browning of foods using a protease-free extract derived from a botanical latex, e.g., fig latex. In the present composition and method, a protease free extract is prepared from crude latex, and used to treat foods susceptible to browning.

A method of producing a protease-free extract is also the subject of the present invention. The method involves treating the crude latex, for example by filtration or centrifugation, to remove aqueous-insoluble components. The filtrate or supernatant obtained after this step is then treated to remove the proteases and other components having a molecular weight of greater than about 5,000 daltons, for example, by isoelectric precipitation or ultrafiltration. The extract obtained after this step is substantially protease-free, that is, it has no detectable protease activity, and protease is absent when analyzed by gel permeation-high performance liquid chromatography (GPC-HPLC).

A method of inhibiting browning of foods using the protease-free extract is described. In this method, foods which are susceptible to browning, including for example, certain shellfish. crustaceans, fruits, vegetables and beverages, including fruit juices and wines, are treated with an amount of the protease-free extract sufficient to inhibit the browning reaction.

The present protease-free extract is as effective as crude latex preparations which may include a protease, and more effective than sodium bisulfite, in inhibiting browning. The protease-free extract of the present invention is a natural, effective treatment for inhibiting or preventing browning in selected foods and beverages, without adversely affecting the appearance, taste, texture or quality of the food or beverage.

DETAILED DESCRIPTION OF THE INVENTION

Figure 1:
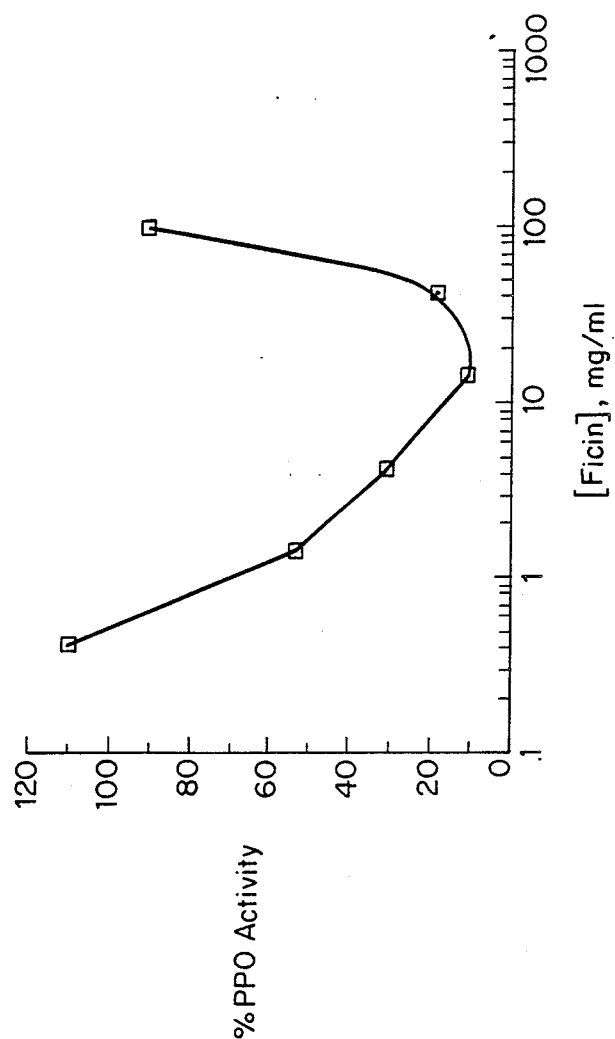
FIG. 1 is a graph showing the inhibition of PPO activity as a function of ficin concentration.

Latices derived from various botanical sources are effective inhibitors of certain enzymatic reactions. For example, latex derived from the fig tree, *Ficus sp.* (*F.sp.*) contains a protease ficin. P. T. Englund et al., *Biochemistry*, 7:163 (1968). Extracts containing ficin prepared from the fig latex have been shown to be effective inhibitors of the enzymatic browning reaction. Labuza et al., *Cereal Foods World*, 34(4):353 (1989). However, ficin treatment is detrimental to the texture and quality of foods because ficin's proteolytic activity degrades protein in the foods. The present invention is based on the discovery that protease-free extracts from natural latices can inhibit browning of foods at least as effectively as the protease-containing extract.

The present invention is a protease-free extract derived from a natural botanical latex. The term "latex" means a liquid generally an emulsion, having a complex composition which is found in some plants, such as in spurges, rubber trees and certain agarics. Latices which are useful as starting material in the present composition and method are latices such as fig latex from F. sp.. Crude latex, or extracts or preparations derived from the crude latex, can be used as starting material Extracts or preparations from latex are sometimes referred to herein as "crude latex extracts". For example, a commercial latex extract prepared from fig latex is available. Fig latex extracts contain ficin and other compounds, are referred to as "crude ficin" or "crude ficin extracts". Crude ficin extracts are particularly useful as starting material in the present invention because they are well-characterized and commercially available. Crude ficin extracts are generally available in solid form, as a powder or tablet. The crude ficin preparations are characterized in that the major protease component is ficin, a protein having a molecular weight of about 20,000 daltons. The presence of ficin can be detected by a method which separates materials based on molecular weight, such as, for example gel permeation-high performance liquid chromatography (GPC-HPLC), and by the ficin-catalyzed hydrolysis of benzoyl-L-arginine-p-nitroanilide (L-BAPNA), which is a sensitive assay for ficin activity.

In the present method of preparing a protease-free extract crude latex, or a crude latex extract is added to an aqueous medium such as water or buffer, thereby forming an aqueous suspension containing an aqueous-insoluble portion suspended in the aqueous phase. The suspension is filtered to remove the aqueous-insoluble portion, and a clear filtrate is obtained. Other methods of removing the aqueous-insoluble portion, such as centrifugation, can also be used in lieu of filtering.

The filtrate, or supernatant, is then treated, to remove the protease and other higher molecular weight components (e.g., components having a molecular weight of more than 5,000 daltons). Such treatment can be accomplished, for example, by isoelectric precipitation, salting out of the protein, or ultrafiltration. Ultrafiltration is a particularly useful method for performing this treatment. All detectable protease is removed by this step. The eluate, or filtrate, after this step is protease-free.

An extract is protease-free if it is substantially free of protease activity and contains no detectable protease. For example, protease activity can be determined by an activity assay and the presence of the protease can be determined by GPC-HPLC.

In one embodiment of the present composition and method, a commercial crude ficin preparation was used as the starting material. Crude ficin powder was dissolved in 50 mM sodium phosphate (pH 6.5) and stirred to form a suspension. The suspension was filtered through a 0.45 $\mu$ filter to remove the aqueous-insoluble material. The clear filtrate was then ultrafiltered using a 5000 MWCO membrane. The eluate was collected and tested for the presence of ficin. GPC-HPLC chromatography showed that the characteristic peak for ficin which elutes at a retention time corresponding to a molecular weight of about 20,000 daltons, was completely absent. The eluate was assayed for ficin activity using L-BAPNA as a substrate and monitoring hydrolysis at 410 nm in a spectrophotometer. The results of the assay showed no detectable ficin activity. Thus, the eluate was determined to be substantially ficin-free.

Protease-free latex extracts prepared by the present method contain one or more components having an apparent molecular weight of less than about 5000 daltons as measured by GPC-HPLC. The ficin-free extract described above has the same PPO-inhibiting activity as crude ficin as determined by a PPO inhibition assay.

The term "apparent molecular weight" means that the component has a retention time, as measured by GPC-HPLC, corresponding to a certain molecular weight compared to a set of standards. Since retention time rather than weight is measured, the term "apparent molecular weight" is used.

The present protease-free extract can be applied to various foods and beverages to prevent or inhibit browning, particularly enzymatic browning. The term "browning" as used herein refers to oxidative darkening or discoloration resulting from the formation of o-quinone and quinone polymers which result from the action of PPO in forming quinones or from the polymerization of quinones which occur naturally in some foods.

To prevent browning the protease-free extract is used to treat the food or beverage in an amount and concentration sufficient to inhibit or prevent browning. The form of treatment will depend upon the food or beverage being treated, and the results sought, and can include, e.g. dipping, spraying, dusting, sprinkling, immersing, mixing and/or soaking. The amount needed will depend upon the susceptibility of the food or beverage to browning, the condition of the food and the storage conditions. The amount sufficient to prevent or inhibit browning can be determined empirically by one skilled in the food art.

In one embodiment of the present invention, pink shrimp were treated with a ficin-free extract prepared as described herein, and compared to shrimp treated with ficin and sodium bisulfite, and untreated shrimp. The untreated shrimp quickly developed black spots (within 1-2 days). The ficin-free extract was as effective as ficin and more effective than sodium bisulfite in inhibiting browning of the shrimp. For shrimp melanosis, a solution containing as little as about 0.25% by weight of the ficin-free extract is effective in inhibiting browning A concentration of about 1.0% by weight is particularly effective for this purpose.

The present invention is based on the discovery that the effectiveness of treatment with a protease preparation (e.g., crude ficin) in inhibiting the browning reaction does not require an active form of the protease or require protease at all. Ficin-free extracts reduce or prevent browning of foods without adversely affecting the texture and quality of the food. Thus, it was determined that ficin itself was not involved in the mechanism for inhibiting the browning reaction.

Without wishing to be bound by theory, it is believed that a low molecular weight component (having an apparent molecular weight of less than 5000 daltons) in crude latex which exists in the protease-free extract, either inhibits the activity of PPO by binding with the enzyme to form an enzyme-inhibitor complex or binds with or otherwise alters its phenolic substrates or quinonoid products. Thus, the browning reaction can be stopped if the substrate is bound to a protein molecule instead of the enzyme, PPO, or if PPO is bound to an inhibitor molecule instead of its substrate. Experiments indicate that ficin itself does not appear to affect the activity of the PPO enzyme (see Example 2) Thus, it appears that hydrolysis of PPO by the protease does not occur, or is not significant, in prevention of the browning reaction.

The composition and methods of the present invention are useful in preventing or substantially inhibiting browning in many types of foods and beverages which are susceptible to browning. Such foods and beverages include, but are not limited to, shrimp, potatoes, apples, bananas, lettuce, peaches, mushrooms, wine and some fruit juices. The present composition is natural, and, unlike protease, does not cause degradation of some foods, particularly shrimp. Browning is "prevented" if it is completely eliminated. Browning is "substantially inhibited" if browning takes place at a significantly lower rate compared to untreated foods in the same time frame.

The invention is further illustrated by the following examples.

EXAMPLES

EXAMPLE 1

Model Assay System for PPO Activity

The effects of crude ficin powders, or fractions thereof, on the activity of PPO were tested using a model assay system on the time scale of minutes. The model system consisted of the following reagents:

50 mM sodium phosphate pH 6.5 (Sigma Chemical Co., St. Louis, Mo.);

0.5 mM L-dihydroxy-phenylalanine (L-DOPA; Sigma Chemical Co.); about 5 μg mushroom tyrosinase (PPO) (Sigma Chemical Co.,); and ±varied concentrations of crude ficin or ficin fractions in 3 mL total volume (Enzeco Ficin Enzyme Development Corp. (EDC), New York, N.Y.)

In this model system the effect of various concentrations of crude ficin inhibiting the activity of PPO on the L-DOPA substrate was measured.

These reagents were combined, and the rate of reaction was determined by monitoring the change in optical density per minute ($\Delta$OD/min.) at 475 nm in a 1 cm pathlength cuvette using a Perkin Elmer UV-VIS spectrophotometer thermostatted to 25° C. PPO activity was assayed versus ficin concentration by addition of varying aliquots of a 100 mg/mL ficin stock solution. Maximal inhibition was observed at 5-10 mg/mL of crude ficin as shown in FIG. 1. At higher concentrations, the inhibition decreased, i.e., the $\Delta$OD/min. at 475 nm increased. The apparent loss of inhibition at high crude ficin concentrations was attributed to other processes which have components that absorb at 475 nm.

EXAMPLE 2

Determination of Proteolytic Activity of Ficin

PPO (Sigma Chemical Co.) was incubated with crude EDC ficin to determine if ficin inhibits the activity of PPO through proteolytic cleavage of PPO. An incubation mixture of 5 mg/mL PPO in the presence of 0.5 mg/mL ficin was prepared in 50 mM sodium phosphate, pH 6.5. A control consisting of 5 mg/mL PPO in sodium phosphate (pH 6.5) without ficin was prepared. Both solutions were placed in a water bath at 25° C. The stability of PPO under these conditions was measured in two ways:

1. PPO activity as a function of time was assayed as outlined in Example 1; and
2. The apparent molecular weight of PPO was analyzed by GPC-HPLC.

Aliquots of the incubation mixture and control were taken over time and diluted into the assay mix as described in Example 1. The activity of PPO from the incubation mix with ficin was about 10% less than the control immediately upon dilution into the assay cuvette, and approached control activity after about 20 minutes. At this point, the ficin concentration in the incubation mix was increased to 5 mg/mL with an identical dilution of the control. The ficin-treated PPO activity fell to less than 40% of the control immediately after the addition of ficin, and over the next 1.5 hours increased to 60% of the control. Recovery of activity over time would not be expected if proteolysis was responsible for the inhibition of PPO activity.

Figure 2:
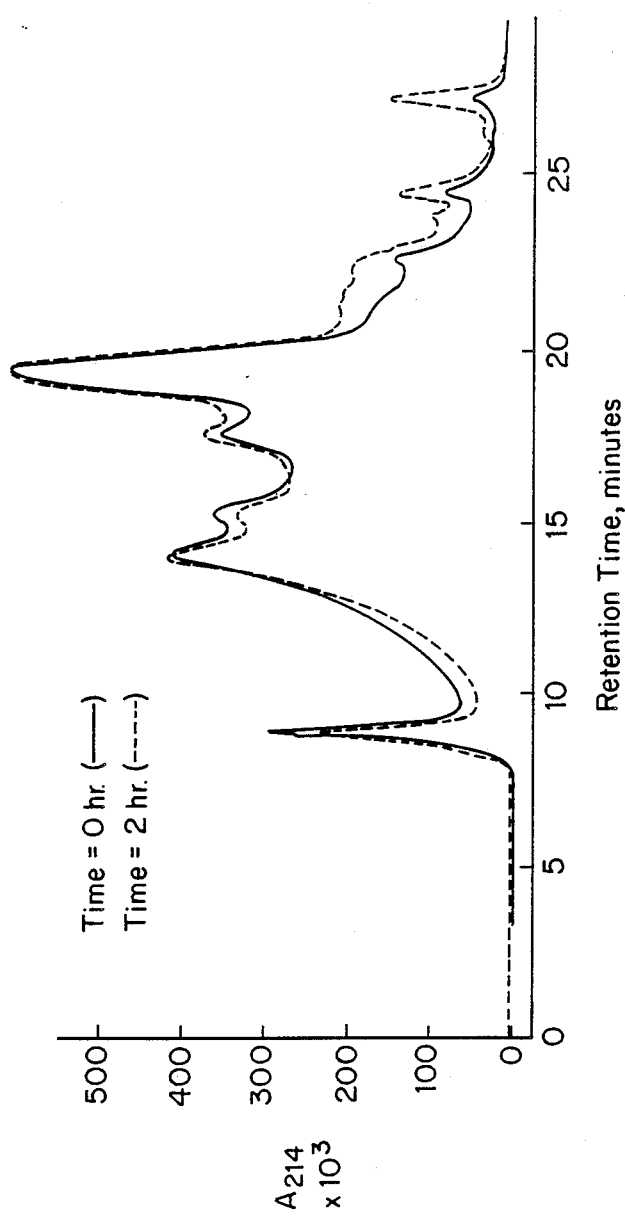
FIG. 2 is a graph showing the results of GPC-HPLC analyses of PPO before and after incubation with ficin.

During the time course of this experiment, aliquots of the PPO/ficin incubation mixture were analyzed by GPC-HPLC as a function of time. Considering the relatively high levels of ficin present, very little proteolysis was detected by this method during the time course of the experiment. Due to the crude preparations of ficin and PPO employed, the actual ficin and PPO peaks were not observed directly but the general trend, shown in FIG. 2, showed that very little lower molecular weight material was produced by proteolysis.

EXAMPLE 3

Preparation Of A Ficin-Free Extract By Ultrafiltration of Crude Ficin

A 50 mg/mL solution of crude EDC ficin was prepared in 50 mM sodium phosphate, pH 6.5. A 5 mL aliquot was filtered with a 0.45 μ filter producing a clear filtrate. A subaliquot (2.5 mL) of the filtrate was ultrafiltered using an Amicon 5000 MWCO YM5 membrane (Amicon Corp., Danvers, Mass.). The ultrafiltered eluate is referred to as the "YM5 eluate".

Following ultrafiltration, the crude ficin the 0.45 μ filtrate and the YM5 eluate were assayed for inhibition of PPO activity using the model system described in Example 1 above. PPO assays were performed in the presence and absence of each of the ficin preparations and the YM5 eluate. All three preparations showed comparable levels of inhibiton.

Figure 3:
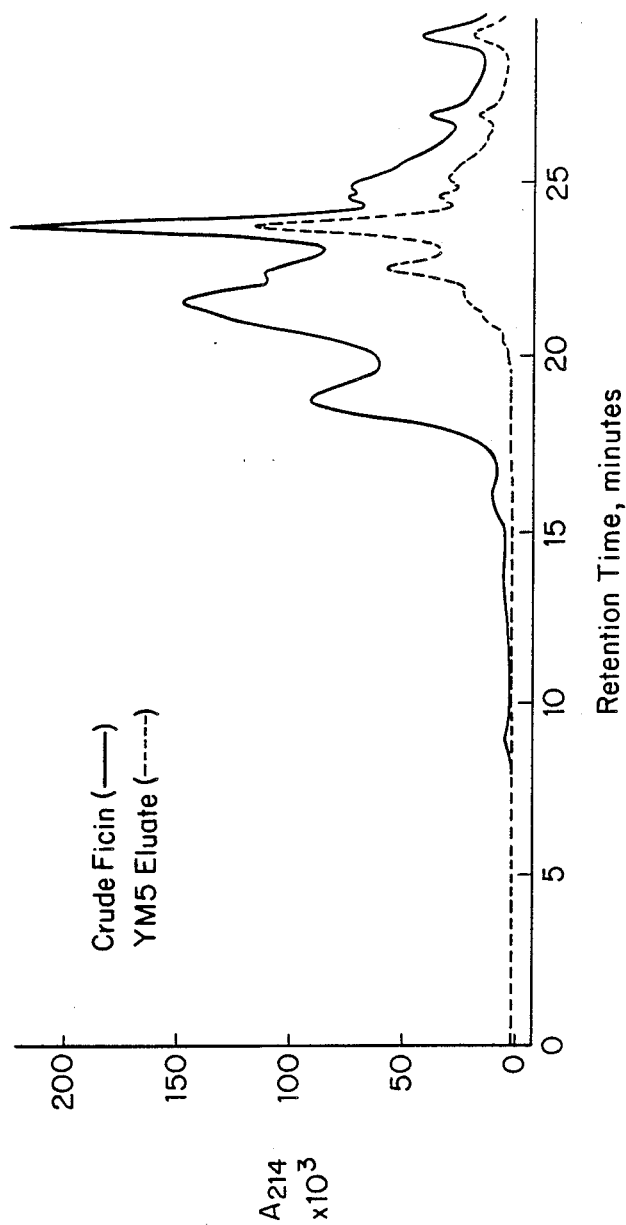
FIG. 3 is a graph showing the results of GPC-HPLC analyses of ficin and a ficin-free extract.

The 0.45 μ filtrate and YM5-ultrafiltered material were analyzed by GPC-HPLC. The results, shown in FIG. 3, show that the YM5 eluate was found to be free of any absorbance at 214 nm in the retention time range corresponding to ficin. The YM5 eluate was essentially ficin-free but still exhibited comparable levels of inhibition relative to the 0.45 μ filtered ficin thus, ficin itself is not involved in PPO inhbition.

EXAMPLE 4

Effect of the Ficin-Free Extract on Pink Shrimp Melanosis

Pink shrimp (Penaeus duorarum) were caught and frozen in Key West, Fla. and thawed prior to treatment. Melanosis was rated in the shrimp according to the scale developed to describe melanosis, shown in Table 1.

TABLE 1

Scale used to describe and rate the
occurrence of melanosis (blackspot) on pink shrimp

| Melanosis Scale | |
|---|---|
| 0 | Absent |
| 2 | Slight, noticeable on some shrimp |
| 4 | Slight, noticeable on most shrimp |
| 6 | Moderate, noticeable on most shrimp |
| 8 | Heavy, noticeable on most shrimp |
| 10 | Heavy, totally unacceptable |

The melanosis scale can be related to existing recommendations developed by the National Marine Fisheries Service for grading raw shrimp. Code of Federal Regulations (1982) Title 50 Part 265, Subpart A, United States General standards for Grades of Shrimp, pp. 262-268. A scale rating of 4 or greater represents a measurable defect in product quality. A rating of 8 or greater would represent a severe defect approaching an unacceptable product.

Harvests were arranged such that fresh, heads-on pink shrimp were obtained within less than 12 hours post-harvest at the dock. All shrimp were routinely washed on-board and temporarily stored in ice. The basic procedure was to rinse 400-600 grams of shrimp in 2.5 liters of variable dip compositions and concentrations for 1 minute, then drain and package in plastic bags to be stored in ice. The bags were considered necessary to eliminate the variable influence of melting ice. Iced containers with packaged shrimp were stored in 35° F. (1.7° C.) refrigeration with reicing every other day.

Development of melanosis was scored and photographed routinely during 2 weeks of storage. The bags of shrimp had been numbered such that the investigator could not distinguish amongst the various treatments. One experienced investigator did all scoring relative to the aforementioned scale (Table 1). The scale was accompanied by predeveloped color prints depicting common examples of the advancing stages for melanosis. The intent was to screen for obvious differences between treatments, thus selecting the best treatments for subsequent tests with statistical evaluations.

The various dips or chemical treatments included tap water as a control, sodium bisulfite at a concentration of 1.25%, crude EDC ficin and a ficin-free extract prepared according to the procedure outlined in Example 3, which is designated "F100". The dip solution was fresh tap water.

The treatment (dips) and ratios of shrimp to dip solution are shown in Table 2.

TABLE 2

| Dip Solution | Shrimp to Dip Ratio Vol./Vol. |
|---|---|
| Control I (tapwater) | 1/5 |
| Control II (tapwater) | 1/1 |
| BIS (Sodium bisulfite) | 1/5 |
| Ficin, tablet form | 1/5 |
| F1p, ficin powder vial I | 1/1 |
| F2p, ficin powder vial II | 1/1 |
| F100, ficin-free eluate (1/5 thru 1/20 dilution with or without buffer B) | 1/2 |

The treatments contained variable additions to tap water, unless otherwise specified in batches made with distilled water. All treatments were complete submergence of the shrimp in the dips for 60 to 80 seconds followed by brief (5-10 seconds) colander drain with mild agitation.

Figure 4:
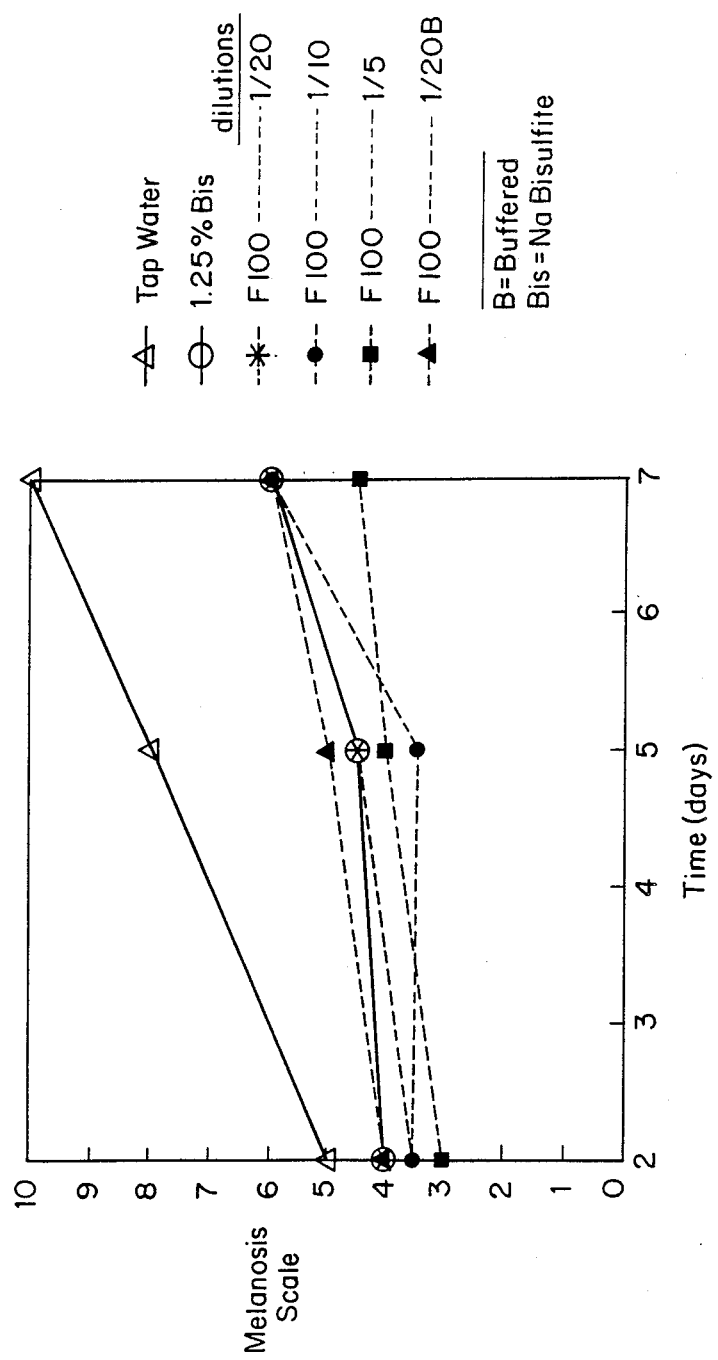
FIG. 4 is a graph comparing the effects of sodium bisulfite and various concentrations of ficin-free extract (F100) on the formation of melanosis in shrimp.
Figure 5:
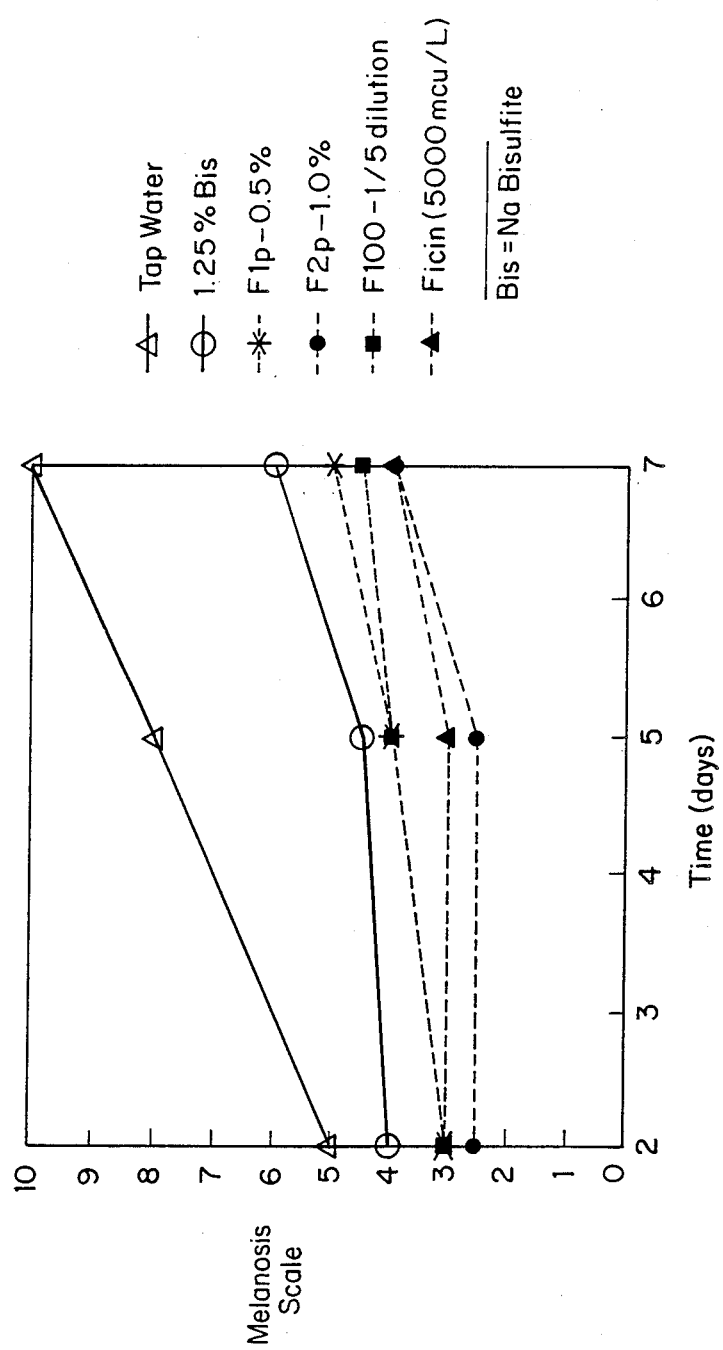
FIG. 5 is a graph comparing the effects of sodium bisulfite, various concentrations of ficin and ficin-free extract (F100) on the formation of melanosis in shrimp.

The results are shown in FIGS. 4 and 5. FIG. 4 shows that the ficin-free extract F100, was as effective as, or better than, sodium bisulfite in reducing melanosis. FIG. 5 shows that F100 was as effective as crude ficin and more effective than sodium bisulfite in reducing melanosis.

EXAMPLE 5

Inhibition of Enzymatic Browning of Apples

Fresh, whole McIntosh apples, held at ambient temperature (22° to 24° C.), were sliced into quarters, cored and cut into ¼ inch slices. The apple slices were treated by brushing the sliced surfaces or dipping the slices by totally immersing them for various time periods: less than 5 seconds, 10 seconds, 1 minute, 2½ minutes and 5 minutes, with the solutions shown in Table 3. Following treatment, the apple slices were allowed to stand at ambient temperature, exposed to air. The slices were checked visually for browning after 0, 1, 2, 3, 4 and 24 hours.

Table 3 Apple Treatments

Controls (1) no liquid, i.e., air only
(2) deionized water, pH 5.8
(3) sodium phosphate buffer, [50 mM], pH 6.7
(4) phosphate buffer [50 mM], pH 2.7 (raised from pH 2.0 using 4.0 N NaOH)

EXPERIMENTAL (5) YM5 eluate, pH 6.3, about 100 mg/mL prepared as described in Example 3 from [200 mg/mL] crude ficin in sodium phosphate
(6) YM5 eluate final pH 4.6 about 100 mg/mL, prepared as described in Example 3 from [200 mg/mL] crude ficin in phosphate buffer, [50 mM], pH 2.7 (raised from pH 2.0 using 4.0 N NaOH)

The results showed that treatments 5 and 6 (Table 3) using the YM5 eluate minimized the extent of browning of the apple slices. All samples were initially (time 0) white in color. Browning of the controls (treatments 1 through 4, Table 3) was observed after 1 hour, with maximum browning occurring after about 3 hours. After 3 hours, no significant browning was observed in slices receiving treatments 5 and 6. After 24 hours, the slices which received treatments 5 and 6 were slightly browned, but exhibited significantly less browning than the controls.

EQUIVALENTS

Those skilled in the art will recognize, or be able to ascertain using no more than routine experimentation, many equivalents to the specific embodiments of the invention described herein. Such equivalents are intended to be encompassed by the following claims.

I claim:

1. A method for inhibiting browning of foods or beverages susceptible to such browning, comprising applying to the foods an amount of a protease-free extract derived from a plant latex sufficient to substantially inhibit the browning of the foods.

2. A method of claim 1 wherein the plant latex comprises fig latex.

3. A method of claim 1 wherein the browning is enzymatic browning.

4. A method of claim 3 wherein the enzymatic browning is due to polyphenol oxidase activity.

5. A method of claim 1 wherein the protease-free extract contains a component having an apparent molecular weight of less than about 5000 daltons.

6. A method of claim 1 wherein the browning is non-enzymatic browning.

7. A method of claim 1 wherein the foods are selected from the group consisting of: crustaceans, shellfish, fruits, vegetables, wines and fruit juices.

8. A method of claim 1 wherein the beverages are selected from the group consisting of: wine and fruit juices.

9. A method of producing a protease-free extract comprising the steps of:
(a) providing a suspension of crude latex in an aqueous medium;
(b) filtering the suspension to remove aqueous-insoluble material thereby obtaining a clear filtrate;
(c) filtering the filtrate obtained in step (b) with a membrane having a nominal molecular weight cut-off of about 5000; and
(d) recovering the eluate from step (c).

10. A method of claim 9 wherein the crude latex is fig latex.

11. A method of claim 10 wherein a crude ficin preparation derived from fig latex is used in lieu of the crude latex.

12. A method of claim 9 wherein the aqueous medium is selected from the group consisting of water and buffer solution.

13. A method of claim 12 wherein the buffer solution is 50 mM sodium phosphate (pH 6.5).

14. A method of claim 9 wherein the protease-free extract has no detectable protease activity.

15. A method of claim 9 wherein the protease-free extract contains a component having an apparent molecular weight of less than about 5000 daltons.

16. A protease-free extract obtained by the method of claim 9.

17. A protease-free latex extract which inhibits enzymatic browning of foods susceptible to such browning.

18. A protease-free extract derived from a plant latex wherein the extract contains at least one component having an apparent molecular weight of less than about 5000 daltons and wherein the extract inhibits enzymatic browning of foods susceptible to such browning.

19. A protease-free extract of claim 18 wherein the enzymatic browning is due to polyphenol oxidase activity.

20. A protease-free extract of claim 18 wherein the foods are selected from the group consisting of crustaceans, shellfish, fruits, vegetables, wines and fruit juices.

21. A protease-free extract of claim 20 wherein the foods are shrimp and mushrooms.

22. A protease-free extract of claim 18 wherein the protease comprises ficin.

23. A ficin-free extract derived from fig latex which inhibits enzymatic browning of food susceptible to such browning.

24. A composition for inhibiting browning of foods or beverages susceptible to such browning, comprising a protease-free extract derived from a plant latex.

25. A composition of claim 24 which is an aqueous solution of the protease-free extract in an aqueous medium.

26. A composition of claim 25 wherein the aqueous solution contains from about 0.25 to about 1.0% by weight protease-free extract.

27. A composition of claim 25 wherein the aqueous medium is selected from the group consisting of: water and buffer.

28. A composition of claim 29 wherein the aqueous medium is 50 mM sodium phosphate.

29. A composition of claim 28 wherein the aqueous medium is water.

30. A composition of claim 24 wherein the protease comprises ficin.

31. A method of inhibiting browning of foods or beverages susceptible to such browning comprising applying to the food or beverage an amount of a ficin-free extract produced by a method comprising the steps of:
(a) providing a suspension of an extract containing crude ficin in an aqueous medium;
(b) filtering the suspension to remove aqueous-insoluble material thereby obtaining a clear filtrate;
(c) filtering a clear filtrate obtained in step (b) with a membrane having a nominal molecular weight cut-off of about 5000; and
(d) recovering the eluate from step (c).

32. A food or beverage susceptible to browning treated with an amount of a protease-free extract derived from a plant latex sufficient to prevent or inhibit browning of the food or beverage.

33. A food or beverage of claim 32 wherein the protease-free extract comprises a ficin-free extract.

* * * * *